Fig. 3a

May 5, 1959     W. RUPPERT ET AL     2,884,894
APPARATUS FOR PRODUCING HARD COATINGS ON WORKPIECES
Filed Oct. 29, 1957            7 Sheets-Sheet 5

Inventors.
Wilhelm Ruppert, Gottfried
Schwedler, Otto Essewein
and Bernhard Fritz
By Bailey, Stephens & Huettig
ATTORNEYS

United States Patent Office 2,884,894
Patented May 5, 1959

2,884,894

APPARATUS FOR PRODUCING HARD COATINGS ON WORKPIECES

Wilhelm Ruppert, Gottfried Schwedler, and Otto Essewein, Frankfurt am Main, and Bernhard Fritz, Frankfurt-Heddernheim, Germany, assignors to Metallgesellschaft Aktiengesellschaft, Frankfurt, Germany Application October 29, 1957, Serial No. 693,179

Claims priority, application Germany November 2, 1956

7 Claims. (Cl. 118—48)

This invention relates to a process and apparatus for forming hard material coatings on metals or similar high melting materials such as graphite and ceramics.

The object of this invention is to produce a process and apparatus for the transforming of metal halides into hard material coatings by means of a chemical reaction or a disintegration by heat from the gas phase. Such material coatings are known as being composed of nitrides, carbides, borides, or silicides of titanium, zirconium, chromium, vanadium and the like.

A further object of this invention is to put the production of hard material coatings, now produced only on the laboratory scale into industrial production, and to produce an electric or gas heated furnace in which the workpieces can be placed in containers, which containers can be successively placed in the furnace without the intermittent heating up and cooling of the furnace.

In general, these objects are obtained by forming a reaction container which can be lowered into and lifted from a heated furnace of a known type. The reaction container is easily detachably connected to supply lines for cooling water and reaction gases and is placed in the furnace for being heated to transform the supplied metal halides into hard material coatings on the workpiece and then removed in heated condition so that it can be immediately replaced by another reaction container. The removed reaction container is then transferred to a place near or remote from the furnace for being cooled. Several electric furnaces can be arranged in a battery, and the reaction containers for each of the furnaces are cooled, opened, and recharged with workpieces in a mutual cooling apparatus.

The reaction container is placed in a suitable electric furnace in such a manner that the upper opened end extends outside of the furnace, with this end being provided with a cooling water jacket and being provided with support rods or clamps or like means for hoisting the container in and out of the furnace by means of a lifting crane. The container is supported in the furnace by means of a supporting frame mounted on the heat insulated cover of the furnace.

The means by which the objects of the invention are obtained, including the details of the reaction container and the lifting crane, are explained more fully with reference to the accompanying drawings, in which.

The reaction container 1 resembles a test tube having a closed bottom and an open upper end. Container 1 is made of quartz or a steel stable at high temperatures, such as a chromium-nickel steel, preferably having more nickel than chromium, or may be of a high temperature stable chromium-nickel alloy. When steels are used, it is advisable to use a higher nickel content in order to avoid the formation of a brittle sigma-phase in those parts of the reaction container while in the electric furnace, the furnace exposing the steel to temperatures of from 600 to 900° C. Such steels are known and can be purchased in the market. It is not necessary to construct the cooled portions of the reaction container and some of the supply lines of high temperature stable steel. Simple steels are sufficient for these parts. However, the use of corrosion resistant steels for these parts has the advantage of a greater efficiency and less maintenance with reference to their stability against acid fluids and corrosive gases.

Figure 1:
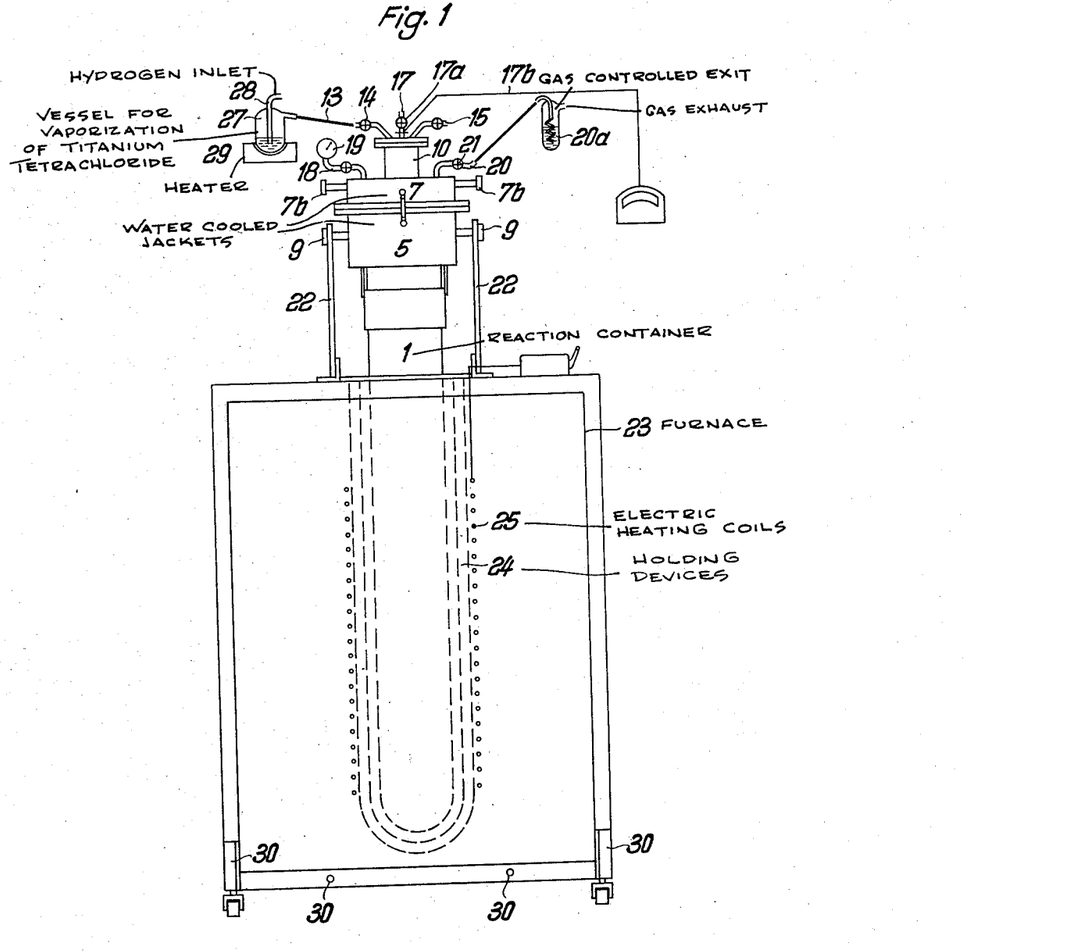
Figure 1 is a front elevational view of the electric furnace and the reaction container installed therein.
Figure 2:
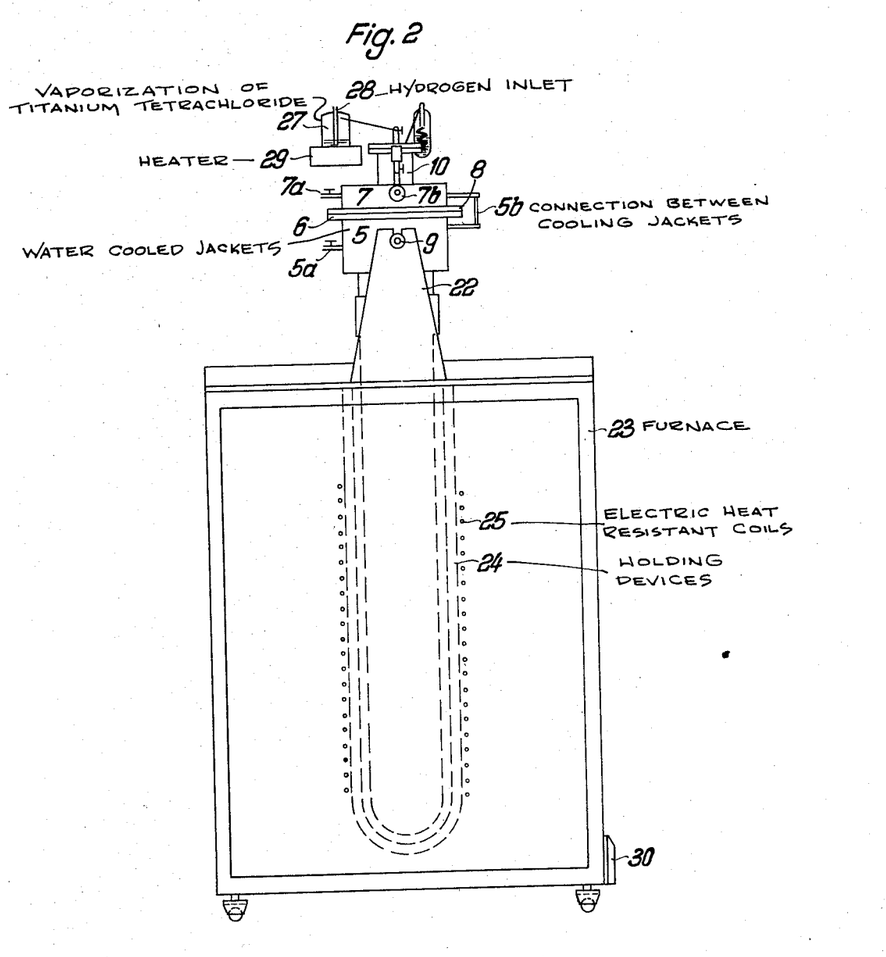
Figure 2 is a side view of Figure 1.
Figures 3, 4, 5:
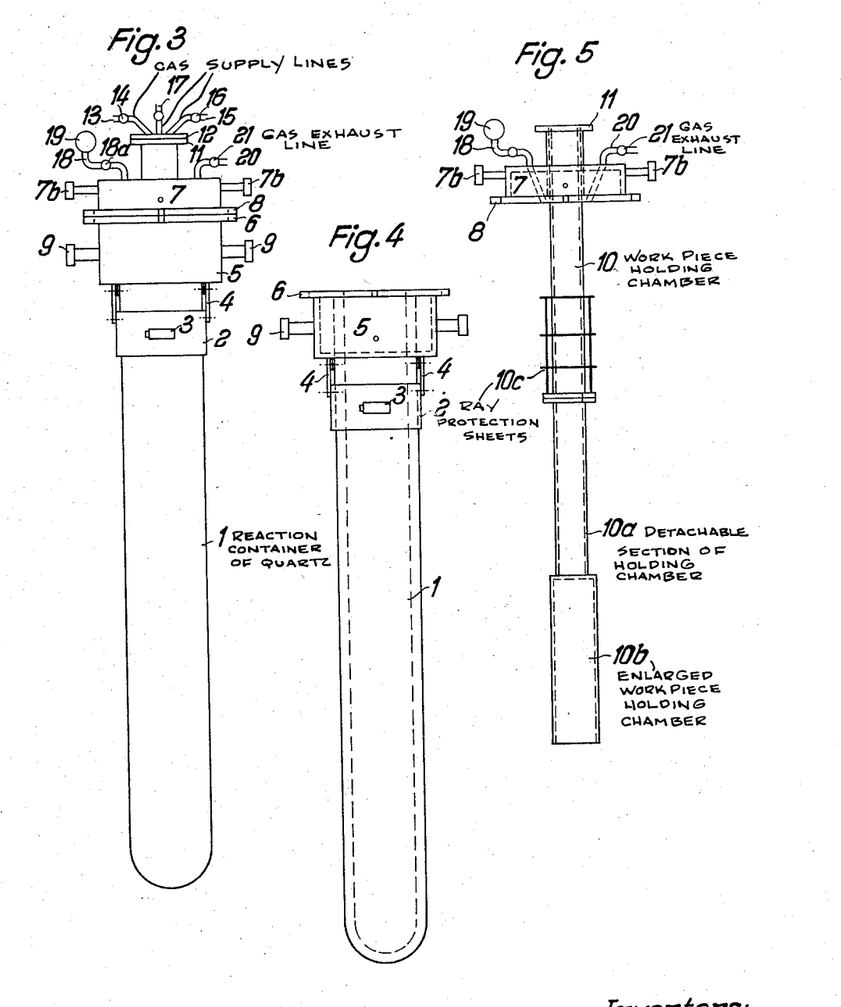
Figure 3 is a front elevational view of the reaction container.
Figure 4 is a view similar to Figure 1 but with the inner treatment chamber tube removed therefrom.
Figure 5 is a front elevational view of the treatment chamber tube.
Figure 3A:
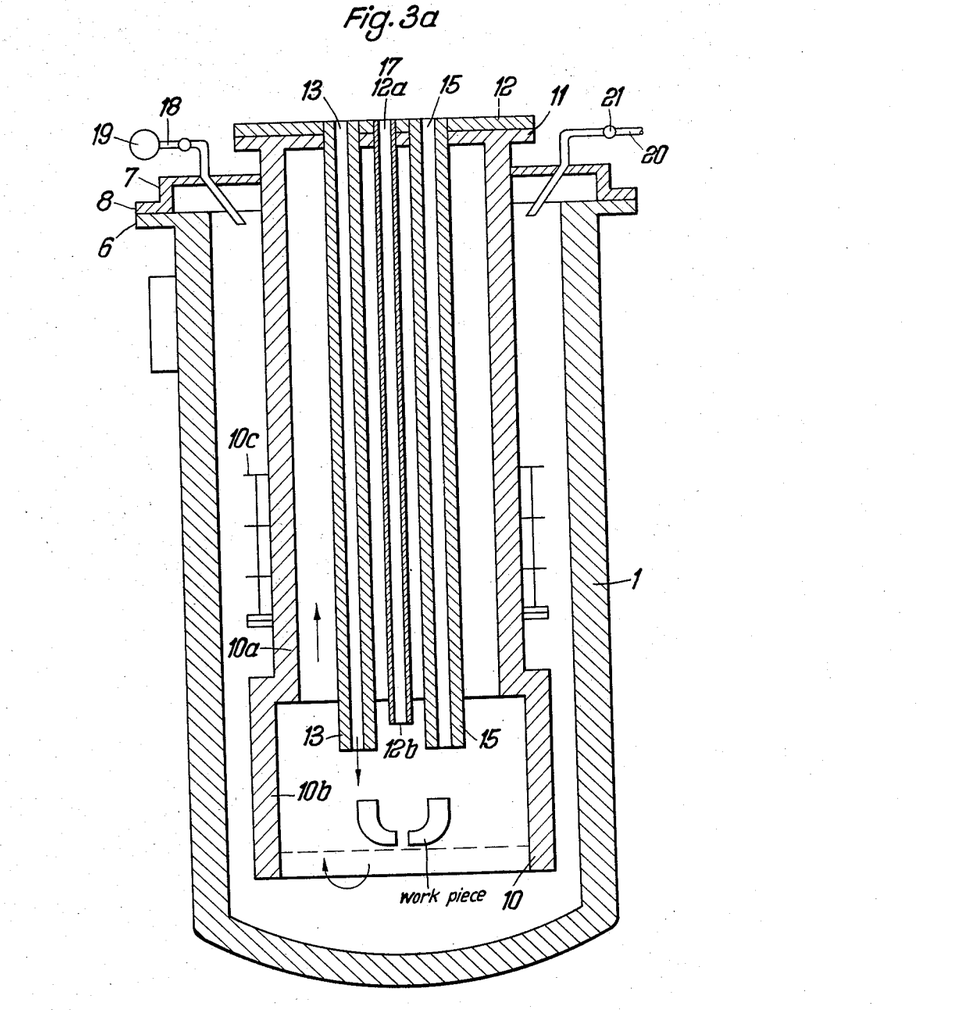
Figure 3a is a vertical cross-sectional view through Figure 3.

As shown in Figures 3 and 4, the upper end of container 1 is surrounded by a collar 2 fastened by clamps 3, and straps 4 connecting the collar to the cooling jacket 5 which communicates with a second cooling jacket 7, the tube being fastened by means of flanges 6 and 8, which are sealed gas tight to the container 1 by means of suitable pressure seals or resinous materials. Pipe fittings 5a and 7a, as shown in Figure 2, are connected to the cooling jackets for supplying the cooling fluid. The cooling water is led into the jacket 7 through a connection 5b, which may be a glass water gauge, and is drained through fitting 7a. These fittings are provided with suitable shut-off valves. In order to lift the container 1, cooling jacket 7 has lifting bolts 7b connected thereto and likewise jacket 5 is provided with lifting bolts 9. Attached to cooling jacket 7 and removably mounted within container 1 is a workpiece holding chamber 10 (Fig. 5). The lower portion of cylinder 10 has a detachable section 10a connectable to the cylinder by means of a flange. The lower end of section 10a has an enlarged workpiece holding chamber 10b adapted to hold the workpieces which are to be coated with the hard materials deposited from the gasphase reaction. Chamber 10b can be adjusted to the form and size of the workpieces inserted therein. Surrounding cylinder 10 are a plurality of ray protection sheets 10c for the purpose of shielding the water jackets from heat radiation. The upper end of cylinder 2 has a flange 11 upon which is seated a flange 12 (Fig. 6) for holding the gas supply lines 13 and 15 inserted with cylinder 10, and also the gas supply line 17 if necessary. These gas lines are suitably fitted with shut-off valves 14, 16 and 17a, respectively. These gas supply lines are for the purpose of introducing the desired gas, such as metal halides, as titanium tetrachloride in a hydrogen atmosphere, as shown in Figure 1, and a supply of a highly volatile gas compound which, together with the metal halides, forms the hard material coating. For example, the carbon for the carbide coating is supplied to the reaction chamber in the form of volatile hydrocarbons. These hydrocarbons, such as methane, are preferably sufficiently thinned with hydrogen, so that no carbon in the form of soot can deposit from the gases onto the workpiece during the reaction at temperatures of from about 900° to 1200° C. The container 1, when assembled with its cooling jacket, is lifted into the furnace. The upper portion of the container 1 is joined by the line 18 having valve 18a to the vacuum and pressure gauge 19 for indicating under and over pressure in container 1. Line 20 having valve 21 constitutes a gas exhaust line for removal of the reaction gases after the decomposition of the metal halides in the reaction chamber, the exhaust gases passing out through the gas controlled exit 20a.

Container 1 is supported in furnace 23 by means of a support frame 22 mounted on the insulated cover of the furnace, lifting bolts 9 being journaled in the frame. Lifting bolts 9 are vertically aligned with lifting bolts 7b. The furnace contains the electric heat resistant coils 25 supported by ceramic from the holding devices 24. From the top of cylinder 10, line 13 is connected to a source of titanium tetrachloride 27. Hydrogen is then introduced through pipe 28 into source 27 to form a hydrogen titanium tetrachloride mixture, which can be controlled through vaporisation by means of the heater 29.

As shown in Figures 3 to 6, the gas supply lines 13 and 15 extend to or within the reaction chamber 10b so that the gases are brought into reaction in this chamber only after being heated by the countercurrent rising exhaust gases in the space between cylinder 10 and container 1. This preheating of the fresh gases supplied to the reaction chamber by means of the exhaust gases is another feature of the invention because this preheating arrangement due to the wide space between container 1 and cylinder 10 produces a very uniform and efficient heat transfer which can be adjusted by technical means as to gas speed by fixing the space between the container and cylinder with respect to the reaction heat. Section 10a of cylinder 10 can also be used for producing one or more volatile reaction components. Consequently, cylinder section 10a can contain the gas lines 13 and 15 and also an enclosed heating coil 12a and be packed with suitable starting substances which will produce gas components by means of evaporation or chemical processes which will occur at the temperatures at which this section of the cylinder 10 is exposed. In order to increase such production of volatile reaction components, such as titanium chloride the gas line 17 at the top of cylinder 10 can supply hydrogen chloride in order to produce a gas from titanium or titanium carbide packed in section 10a and then the volatile titanium chloride produced is passed directly into reaction chamber 10b.

After the deposition of the hard coatings by the reaction on the workpiece, the container 1 is removed from the furnace and taken to a place near or remote from the furnace for cooling and annealing. Fittings 30 on the bottom of the removable furnace 23 are for the purpose of quickly aligning the furnace with a lifting crane for removing container 1.

Figures 6, 8:
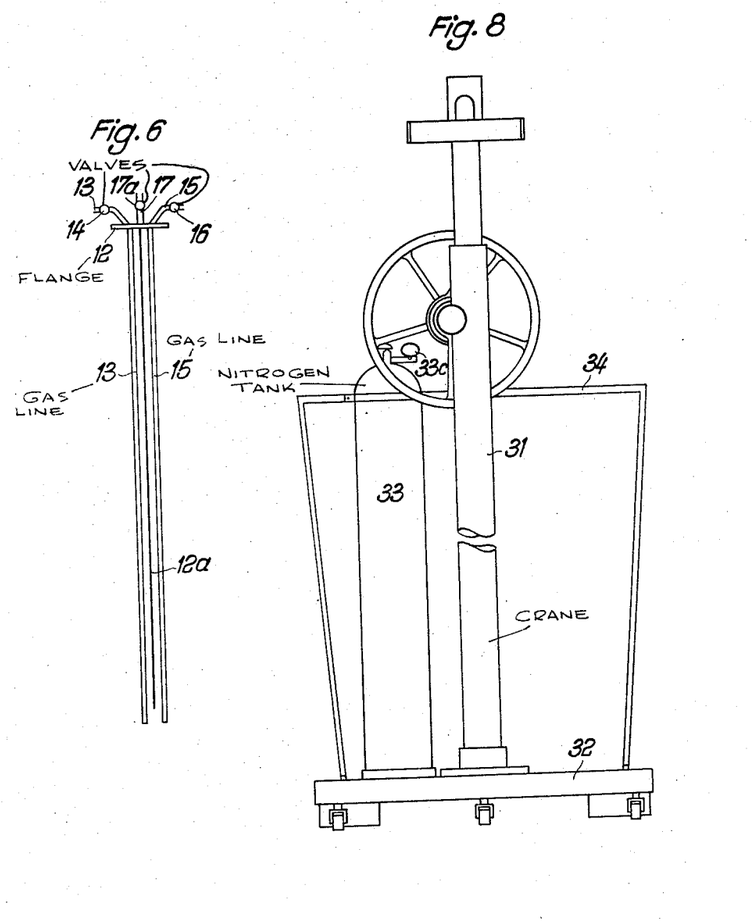
Figure 6 is a front elevational view of the gas pipes removed from the treatment chamber tube.
Figure 8 is a side elevational view of Figure 7.
Figure 7:
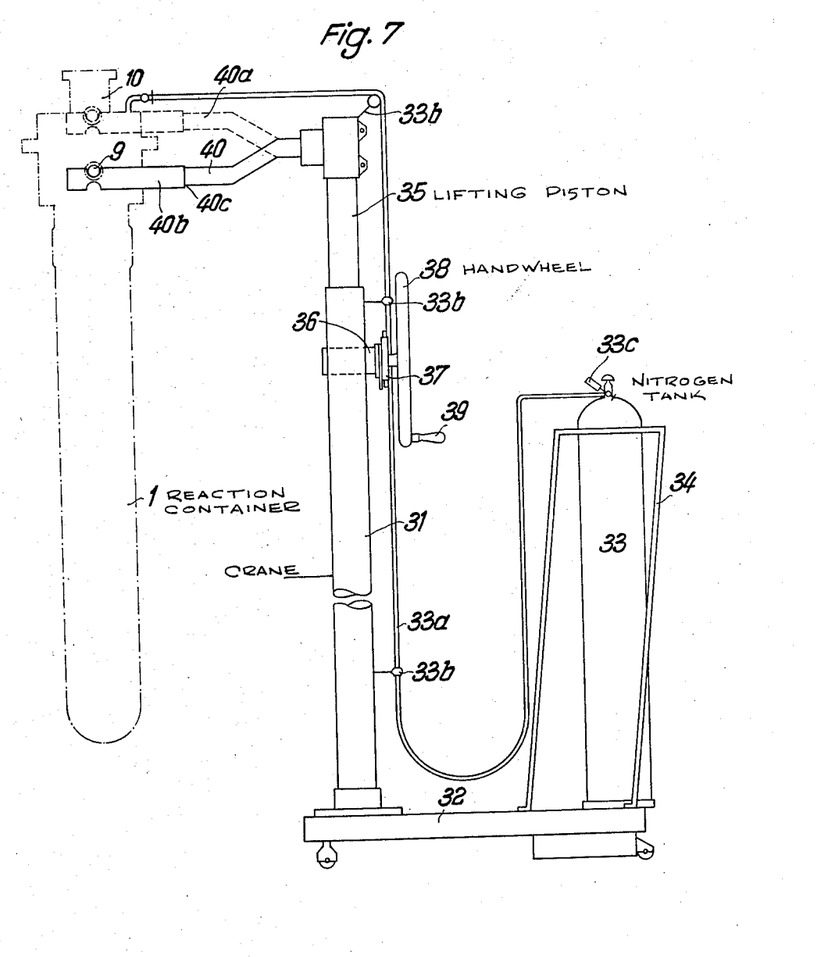
Figure 7 is a front elevational view of the lifting crane for the reaction container.

Such crane is shown in Figures 7 and 8 and is composed of a fixed post 31 mounted on a base 32 which also supports a nitrogen tank 33. This tank is adapted to feed nitrogen to container 1 through the gas line 33a passing over guides 33b and adapted to be tapped into gas exhaust valve 21. The nitrogen line 33a is connected to tank 33 by means of valve 33c. The tank is protected by railing 34. Movable member 35 which can be either a rack or a piston, is telescoped within post 31. If member 35 is a rack, it can be elevated or lowered by turning shaft 35 through gears and brake means 37 by handwheel 38 and handle 39. Arms 40 are carried by member 35, and these arms have extensions so that they can either be fitted to lifting bolts 7b within the position shown at 40a, or lifting bolts 9 as shown at 40b by reason of the rotatable and detachable joint 40c. Thus the arms can be used for lifting the container from the furnace and for lifting the cylinder 10 from the container.

Alternative to the manual drive for member 35, other drives are possible, for example, by use of a small electric motor. A pneumatic drive is very simple. For such the movable member 35 is closely fitted within post 31 and functions as a piston. A compressed air bottom is mounted adjacent nitrogen tank 33 for feeding compressed air into the bottom of post 31 to lift or lower member 35. Preferably two telescoping shields against heat for protection of the nitrogen tank 33 radiation are mounted on post 31 and member 35 (not shown).

Figures 9, 10:
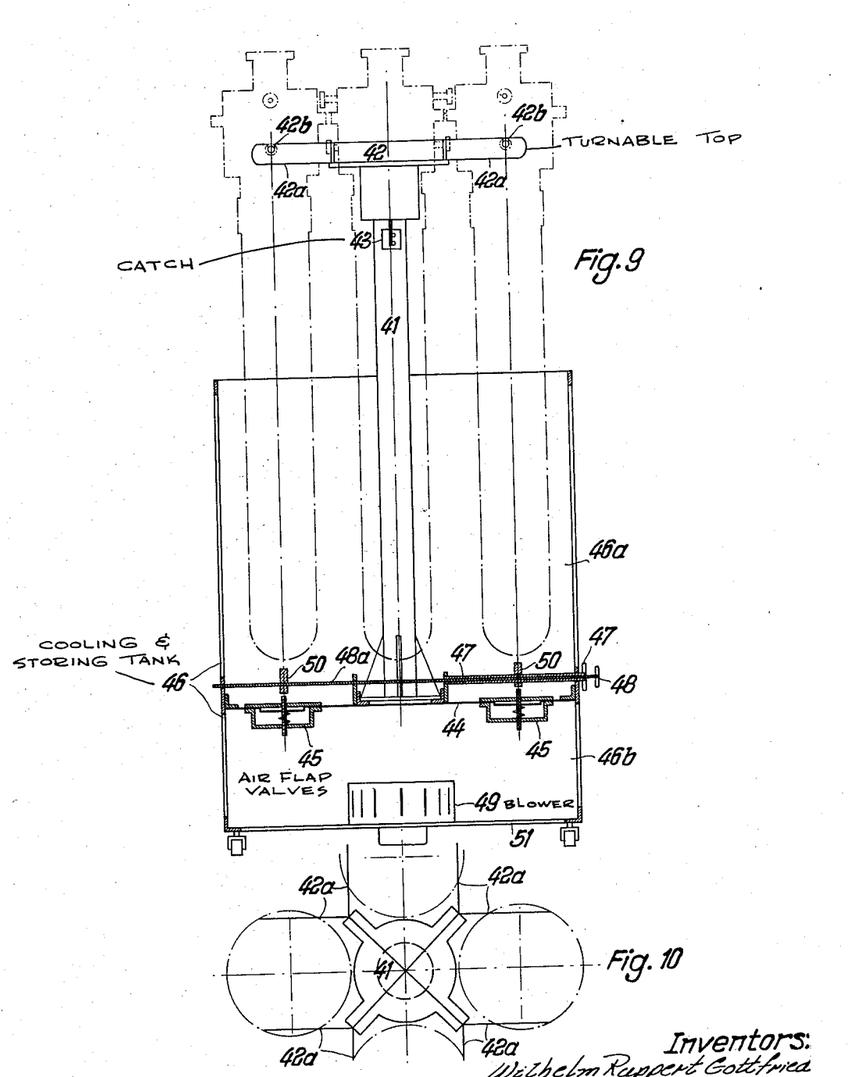
Figure 9 is a cross-sectional view through the reaction container cooling tank.
Figure 10 is a partial plan view of Figure 9.

The cooling, and storing tank is shown in Figures 9 and 10. This is composed of a central column 41 having a turntable top 42 which can be located into position by means of a catch 43. Top 42 has arms 42a in which are slots 42b for receiving the lifting bolts 9 of the container 1 or the bolts 7b of the tube insert. The figures show a particularly favorable arrangement in which the column 41 is mounted on the upper part of a double bottom 44 having large spring-pressed air flap valves 45 within tank 46. These valves automatically close the openings between the upper chamber portion 46a and the lower chamber portion 46b. Levers 47 and 48 extending over the concentric shafts 47a and 48a and the excentric discs 50 are for regulating the control of air produced from the blower 49 seated on the bottom 51 of tank 46.

A somewhat similar arrangement can be made also if the reaction containers 1 are composed of high temperature stable steel and are to be cooled in water. The double bottom 44 having air flaps 45 with the controls therefor is replaced by a strong frame for supporting column 41. The ventilator is replaced by a fluid pump and the tank closed by bottom plate 51. Water supply and drains are then fitted to tank 46.

The operation of the electric furnace for producing titanium carbide coatings, according to the invention, is as follows:

In order to load the container 1 with the workpieces to be coated, the container is placed in the tank 46 being supported on arms 40. The container is lifted by engaging the arms with the lifting bolts 7b in the position shown at 40a in Figure 7. The workpieces are then placed in the enlarged reaction chamber 10b from below, such workpieces being die nozzles e.g. or die matrices. These workpieces are held in place by clamps or other means in chamber 10b. The leaded cylinder 10 is then inserted in reaction container 1 by means of the crane. The flanges 6 and 8 are then clamped together and sealed by means of annular gaskets composed of rubber or acid stable plastics. Valves 14 and 16 are closed, and valves 18a and 21 are open. Air in the reaction container 1 is pumped out through pipe 20 and the container then filled with pure hydrogen, exhausted, and again filled with hydrogen. The exhausting and filling with hydrogen is indicated on gauge 19. After the last hydrogen filling, valve 21 is closed.

Carrier arm 40 of the crane is then moved to position 40b, Figure 7, and container 1 lifted from the storage rack by means of bolts 9, the crane moved to the preheated electric furnace, and the crane aligned with the furnace by engaging fittings 30, whereupon the container 1 is placed in the furnace by lowering member 35.

After a few minutes, the rise of temperature of the hydrogen in the container causes a pressure increase which is indicated on pressure and vacuum meter 19. The water connection is then made to the cooling jacket and the gas lines connected. Before connecting the gas lines to the gas sources, a little excess pressure is relieved through valves 14, 16 and 21 to blow out any air remaining in the gas lines. It is advisable to maintain a slight excess pressure in container 1 while inserting and removing the container from the furnace. The workpieces in the reaction chamber 10b and the lower portion of the reaction container 1 now become heated to reaction temperature. While so heated, pure hydrogen or a mixture of pure hydrogen and volatile hydrocarbons, which preferably does not contain more hydrocarbons than its equilibrium with hydrogen and solid carbon at the depositing temperatures for the carbide coating, is passed through pipe 15 into reaction container 1, and the gas exhausted through pipe 20 and valve 21 and exhaust gas control 20a. Valve 18a is then closed. The heating time not only depends upon the size of reaction container 1 and the workpieces, but also upon the material of the container. Reaction containers composed of quartz take much longer to heat under the same conditions than the time required for heating containers composed of heat stable steels. After the reaction temperature of, for example, 950° to 1000° C. is reached, the reaction container 1 is kept for about another one-half hour with hydrogen flowing through the container or the desired hydrogen hydrocarbon mixture, respectively, and only then is the TiCl₄ passed through the tube 13 and valve 14, and if necessary, additional pure hydrogen for the depositing of the carbide from the volatile hydrocarbons. For the carbide depositing, the concentration of the hydrocarbon is chosen preferably with reference to the total reaction gas so that out of the mixture no soot in the form of carbon particles can be deposited. The supply of titanium tetrachloride is by means of the apparatus shown at 27, 28 and 29 in Figure 1. By feeding hydrogen through pipe 28 and then through the evaporation vessel 27 containing titanium tetrachloride, a hydrogen titanium tetrachloride mixture is formed and passed through pipe 13 into cylinder 10. The concentration of the titanium tetrachloride in the gas mixture is controlled by adjusting the velocity of the hydrogen, and especially well by thermostats adjusting the temperature of the titanium tetrachloride. The concentration of the titanium tetrachloride vapors is adjusted according to the mixed amount or hydrocarbons, as, for example, the methane introduced through pipe 15. The quantity and gas velocities are easily adjusted so that within the reaction time of from about 3 to 5 hours the workpieces acquire the desired coating. When the carbide deposit is completed, the mixture of TiCl₄ hydrogen is shut off, and the container 1 is flushed for about one-half hour with pure hydrogen or the described device hydrogen hydrocarbon mixture. Valves 14, 16 and 21 are then closed, valve 18a opened, the water connections for pipes 5a and 7a disconnected, the reaction container 1 removed from the furnace by means of the crane and the reaction container put in the cooling and storing tank. When the reaction container 1 is removed from the furnace, the average temperature of the container increases in spite of the cooling of the lower portion thereof, so that a pressure increase is indicated on gauge 19, this being for about 10 to 20 minutes for reaction containers composed of quartz. As the cooling progresses, the excess pressure disappears and a vacuum formed which is also read on pressure and vacuum gauge 19, the other gas line valves being closed. This vacuum causes the danger that through leaks which might appear during the depositing of the coating on the workpiece, air is sucked into the container which could cause the hydrogen to explode. To avoid this, nitrogen is applied to the reaction container 1 through valve 21 so that the reaction container remains under undiminished pressure during the first cooling stage. The nitrogen is furnished from the tank mounted on the crane and flows through pipe 33a held by supports 33b. This precautionary measure suffices for preventing a vacuum under all conditions of the moving of the reaction container 1 having a temperature of from 900° to 1000° C. In the cooling tank, gas pipe 15 is connected to the hydrogen gas source, exhaust line 20 is connected, and pipes 5a and 7a connected for the cooling of the flanges. Container 1 is then left to cool under flowing hydrogen. The rate of cooling can be easily increased by means of the air blower 49 or from a compressed air stream, both blowing fresh air against the hot reaction container. Further air flow control is obtained by means of the air flaps 45. This form of cooling is preferred for reaction containers composed of quartz or high grade steels.

Higher cooling speeds can be achieved with containers composed of high grade steels if the cooling tank is filled with water with the container submerged therein and the water circulated by a pump in order to provide a flow of water which avoids forming steam bubbles, as the latter slow down the rate of cooling. This latter arrangement has the great advantage in that, for a large number of air hardened steels, a sufficiently rapid cooling of the reaction container is obtained so that tools produced from these steels are completely hardened. This means that the depositing of the coatings on the tools can be combined with the tempering of the tools without the need of other expensive apparatus. The disclosed process and the workpieces or tools produced thereby are therefore also a part of the instant invention.

The invention is not limited to the process of applying TiC coatings on workpieces, but other hard material coatings such as carbides of zirconium, vanadium, chromium and the like, and the nitrides, borides and silicides of titanium, zirconium, vanadium, chromium and the like can be deposited. The treatment of the workpieces with the aid of a diffusion process and also with the thermal decomposition and reduction of the metal halides can be performed advantageously by means of the described apparatus.

A further feature of the invention is in that, by the use of an electric furnace, a reaction container of quartz or heat stable steel, and a cooling tank, the degassing of the material in the apparatus can be easily performed at a vacuum below 1 mm. Hg, especially at $10^{-2}$ to $10^{-4}$ mm. Hg at temperatures from 600° to 700° C. and preferably up to 1000° C. To increase the vacuum, getter metals can be used in the reaction container 1 containing the workpieces to be degassed so that in the disclosed apparatus the workpieces can be degassed simultaneously with articles to be coated with titanium carbide located elsewhere in the container.

Diaphragm valves having diaphragm of resinous material or corrosion resistant rubber are especially useful for the valves 14, 16, 17a, 18a, and 21 mounted on the upper end of the reaction container. For the disposition of the fore-mentioned high melting borides, nitrides and silicides the volatile hydrocarbons are to be replaced by the volatile compounds of boron, silicon and nitrogen respectively.

Having now described the means by which the objects of the invention are obtained, we claim:

1. An apparatus for producing hard coatings on workpieces comprising a furnace, a reaction container removably supported within said furnace and having an end portion extending outwardly of said furnace, workpiece holding means mounted within said container, a plurality of separated gas passageways in said container extending from said end portion to said workpiece holding means, reaction gas supply lines joined to said end portion and communicating, respectively, with said passageways, and a cooling jacket surrounding said end portion.

2. An apparatus as in claim 1, said workpiece holding means comprising a chamber removably fastened to said container.

3. An apparatus as in claim 2, further comprising vacuum means connected to said container for degassing workpieces placed in said chamber.

4. An apparatus as in claim 1, further comprising corrosion resistant diaphragm valves connected in said reaction gas supply lines.

5. An apparatus as in claim 1, said workpiece holding means including a cylinder mounted in said container and forming said separated gas passageways.

6. An apparatus as in claim 5, further comprising shields within said container surrounding said cylinder for protecting said cooling jacket against heat radiation from said workpiece holding means.

7. An apparatus as in claim 1, further comprising tubes mounted in said cylinder and joined to said reaction gas supply lines, said tubes extending to said workpiece holding means and forming said separated gas passageways.

References Cited in the file of this patent

UNITED STATES PATENTS

| | | |
|---|---|---|
| 2,587,036 | Germer | Feb. 26, 1952 |
| 2,602,033 | Lander | July 1, 1952 |
| 2,759,848 | Sullivan | Aug. 21, 1956 |
| 2,813,803 | Homer | Nov. 19, 1957 |